US011159716B1

(12) United States Patent
Adoni et al.

(10) Patent No.: US 11,159,716 B1
(45) Date of Patent: Oct. 26, 2021

(54) PHOTOGRAPHY ASSIST USING SMART CONTACT LENSES

(71) Applicant: International Business Machines Corporation, Armonk, NY (US)

(72) Inventors: Siddique M Adoni, Bangalore (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/027,031

(22) Filed: Sep. 21, 2020

(51) Int. Cl.
*H04N 5/232* (2006.01)
*H04N 1/00* (2006.01)
*H04N 101/00* (2006.01)
*G06F 3/01* (2006.01)

(52) U.S. Cl.
CPC ....... *H04N 5/23222* (2013.01); *H04N 1/0044* (2013.01); *H04N 1/00129* (2013.01); *H04N 1/00209* (2013.01); *H04N 1/00246* (2013.01); *H04N 1/00381* (2013.01); *H04N 1/00403* (2013.01); *H04N 1/00411* (2013.01); *H04N 5/23229* (2013.01); *G06F 3/013* (2013.01); *H04N 2101/00* (2013.01); *H04N 2201/0084* (2013.01)

(58) Field of Classification Search
CPC ........... H04N 1/00129; H04N 1/00209; H04N 1/00246; H04N 1/00381; H04N 1/00403; H04N 1/00411; H04N 1/0044; H04N 5/23222; H04N 5/23229; H04N 2101/00; H04N 2201/0084
See application file for complete search history.

(56) References Cited

U.S. PATENT DOCUMENTS

| 8,472,120 | B2 | 6/2013 | Border | |
|---|---|---|---|---|
| 10,165,949 | B2 | 1/2019 | Tzvieli | |
| 10,373,583 | B2 | 8/2019 | Borenstein | |
| 10,499,001 | B2 | 12/2019 | Van Geel | |
| 2016/0155009 | A1* | 6/2016 | Han | G06K 9/346 382/173 |
| 2017/0374280 | A1* | 12/2017 | Chan | H04N 5/23293 |
| 2019/0107935 | A1* | 4/2019 | Spivack | G06T 13/40 |
| 2020/0355925 | A1* | 11/2020 | Hu | G02B 27/0093 |
| 2021/0088439 | A1* | 3/2021 | Cho | G01J 1/0488 |

OTHER PUBLICATIONS

Anonymous et al., "Smart Contact Lenses 'Talk' to Your Phone", The Gospel Herald, Aug. 22, 2016, 2 Pages.
Anonymous, "What Happened to the Plans for a Smart Contact Lens for Diabetics?", Labiotech, Europe, Jan. 25, 2018, 4 Pages.
Sherr, Ian, "You've heard of AR glasses, but this startup wants to make them into contact lenses", CNET, Nov. 14, 2018, 3 Pages.
Williams, Rhiannon, "Samsung's smart contact lens could communicate with smartphones through your eyes", The Telegraph, United Kingdom, Apr. 7, 2016, 3 Pages.

* cited by examiner

*Primary Examiner* — Daniel M Pasiewicz
(74) *Attorney, Agent, or Firm* — Alexander G. Jochym (57) ABSTRACT

A computer program in a computer system with one or more processors receives digital image data from a smart camera and sends the digital image data from the smart camera to smart contact lenses worn by a first user in the digital image data. The approach includes one or more processors receiving from a user interface in the smart camera, an instruction, from a second user, for at least one change to the first user and sending the instruction for the at least one change to the smart contact lenses worn by the first user.

17 Claims, 9 Drawing Sheets

PHOTOGRAPHY ASSIST USING SMART CONTACT LENSES

BACKGROUND

The present invention relates generally to the field of photography, and more particularly to a program in a smart digital camera communicating with smart contact lenses worn by one or more subjects to be photographed.

Smart contact lenses are available today that correct color blindness, that seamlessly transition from light to dark environments, that correct myopia, and even smart contact lenses that slow the progression of nearsightedness in children. Typically, smart contact lenses consist of a pair of soft contact lenses with a number of very thin, biocompatible electronic devices and sensors. Providing an augmented reality display in the smart contact lenses for the user wearing smart contact lenses is one developing aspect of smart contact lenses technology. Augmented reality (AR) is an interactive experience of a real-world environment where the objects that reside in the real world are displayed and, in some cases, enhanced by computer-generated perceptual information.

SUMMARY

Aspects of an embodiment of the present invention disclose a method, computer program product, and computer system include one or more processors in a computer system receiving digital image data from a smart camera and sending the digital image data from the smart camera to smart contact lenses worn by a first user in the digital image data. The method includes one or more processors receiving from a user interface in the smart camera, an instruction from a second user for at least one change to the first user and sending the instruction from the second user for the at least one change to the first user to the smart contact lenses worn by the first user.

DETAILED DESCRIPTION

Embodiments of the present invention recognize that a photographer may desire to capture a specific view or specific views of a subject in a photograph. Embodiments of the present invention recognize that an ability to accurately communicate a desired gaze direction of a subject or a model for a specific view is important to the photographer desiring to capture a specific look of the model. Embodiments of the present invention recognize that an ability to quickly and accurately communicate an exact gaze direction to a model is valuable to the photographer and the client paying for the photographs. Embodiments of the present invention recognize providing an exact verbal description of a desired pose to the model or to a group of subjects in a photograph can be difficult. Furthermore, embodiments of the present invention recognize that an ability to communicate a set of desired poses to one or more subjects for a series of desired photographs in a photo shoot can be difficult and time consuming. Embodiments of the present invention recognize the longer it takes a photographer to capture the desired photographs, the more expensive the photograph or the photo shoot is for the client. Embodiments of the present invention recognize that capturing one or more desired digital images quickly and efficiently is desirable.

Embodiments of the present invention provide a method, a computer program, and a computing system to communicate one or more of a desired model gaze direction, a desired model gaze focal point, a specific pose for the model demonstrated in a previously captured digital image, a set of desired poses for the model(s), or a text message with specific instructions directly to one or more models or subjects in photograph using a program in a photographer's smart camera and an application in smart contact lenses worn by the subject(s).

Embodiments of the present invention provide a number of different methods of communicating one or more of a photographer's desired poses to subjects in a photograph or a captured digital image. Embodiments of the present invention include using photographer input instructions to the program in the smart camera to provide to smart contact lenses worn by a subject a desired gaze direction or a desired pose of a subject. The program sends the photographer input instructions to an application in the smart contact lenses worn by each of the subjects in the photograph or in a photo shoot. Embodiments of the present invention provides a method and a program that allows a photographer to quickly and accurately capture a desired digital image of the subject(s). Using the photographer inputs to the program in the smart camera, the program sends one or more of a desired gaze direction, a focal point, a text message with an instruction, or a digital image of a desired pose to one or more photograph subjects in order to quickly and accurately capture the photographer's desired digital image of the subject for a photograph.

Embodiments of the present invention provide a method of communicating, at one time, a series of the photographer desired poses to the photograph subjects using the program in the smart camera. The photographer inputs instructions to the program in the smart camera to send a series of desired poses to the application in the smart contact lenses worn by the subject or model. In these embodiments of the present invention, instructions for each pose of the series of desired poses can be input by the photographer to the program in the smart camera as one or more of a series of previously captured digital images to be sequentially displayed in the subject's contact lenses, a sequence of desired subject gaze directions, or a text message with a sequence of instructions for the subject or model's poses. The program in the smart camera provides the instructions for each pose to the application in the smart contact lenses for display to the photograph subject or subjects.

Embodiments of the present invention provide an ability for the photographer to input instructions to the program in a smart camera that are provided to smart contact lenses worn by a photograph subject. The instructions are displayed to the subject in an augmented reality display of the smart contact lenses. In this way, embodiments of the present invention provide a direct and efficient way to quickly for a photographer to clearly communicate to each subject in a photo shoot, the photographer desired pose or poses. Additionally, embodiments of the present invention provide a method for a model or a photograph subject to view a captured digital image and, in near real-time, request an edit of the captured digital image.

Embodiments of the present invention provide a method for a program in the smart camera to receive one or more requests from the application in the smart contact lenses worn by a model a change to captured digital image of the model in near real-time. Embodiments of the present invention provide a method for the program to receive and execute one or more model requested changes or alterations to the appearance of the model in the captured digital image in near-real time. The program in the smart camera provides a way for a model to augment at least one aspect of their appearance by sending a request to the program in the smart camera to alter a captured digital image. The program in the smart camera quickly alters the digital image of the model which is sent back to the application in the smart contact lenses for model approval. In this way, embodiments of the present invention provide a method to efficiently capture the digital image or photograph of a model, a group of models or subjects that is acceptable to both the model and the photographer.

The figures provide only illustrations of various implementations of the present invention and does not imply any limitations with regard to the environments in which different embodiments may be implemented. Implementation of embodiments of the invention may take a variety of forms, and exemplary implementation details are discussed subsequently with reference to the Figures. For purposes of the present invention, the terms "model" and "subject" may be used interchangeably to describe a user of an assist application, such as assist application 16 in smart contact lenses worn by the user. Many modifications to the depicted environment may be made by those skilled in the art without departing from the scope of the invention as recited by the claims.

Figure 1:
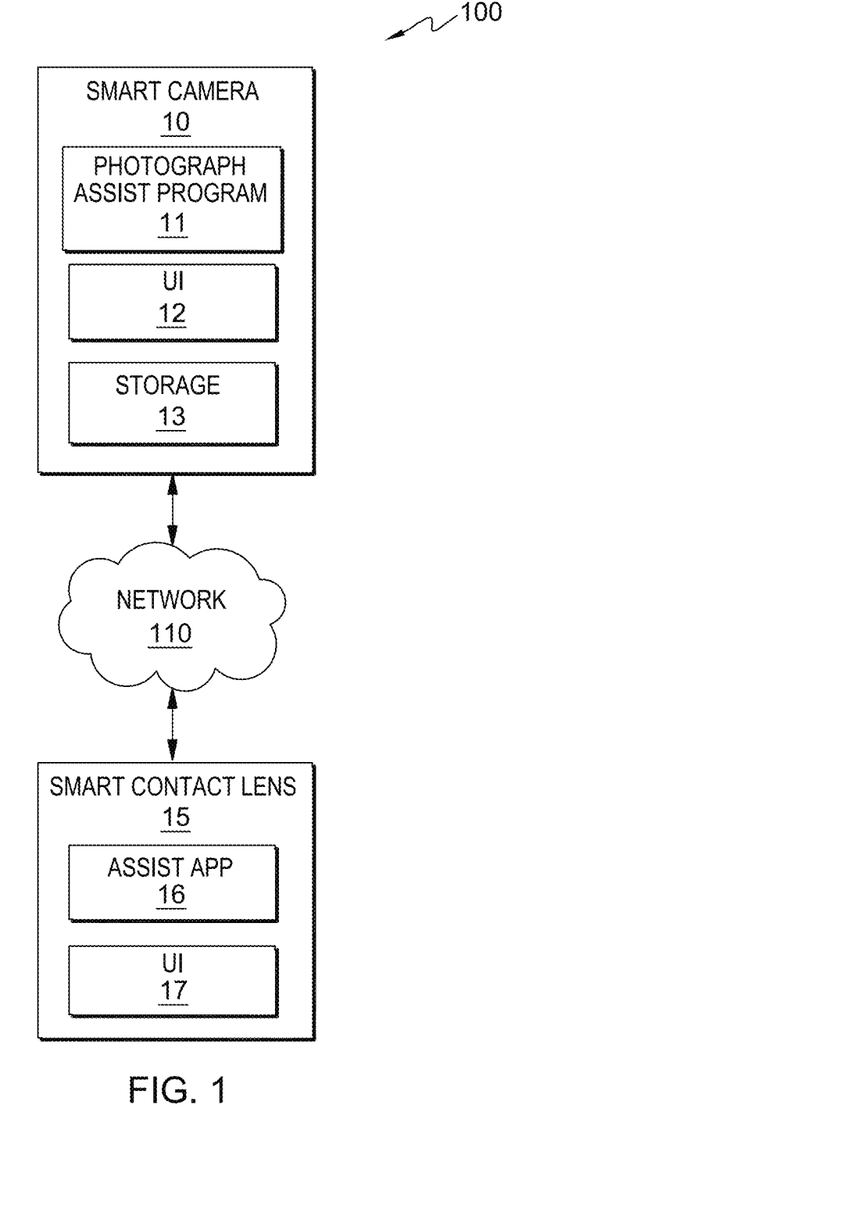
FIG. 1 depicts a functional block diagram of a computing environment suitable for operation of a photograph assist program executing in a smart camera with an application in smart contact lenses, according to an embodiment of the invention.

FIG. 1 depicts a functional block diagram of computing environment 100 suitable for operation of photograph assist program 11 in smart camera 10 executing with assist application 16 in smart contact lenses 15, according to an embodiment of the invention. While depicted as a single pair of smart contact lenses 15 in computer environment 100 of FIG. 1, in various embodiments, multiple pairs of smart contact lenses 15 worn by multiple photograph subjects are present in computer environment 100. For example, a group of ten people with each person wearing a pair of smart contact lenses 15 can be exchanging data over network 110 with photograph assist program 11 in smart camera 10.

Computing environment 100 may include smart camera 10 and at least one pair of smart contact lenses 15 connected over network 110. Network 110 can include, for example, wireless local area network (WLAN), a localized wireless communication, a short range, low power wireless network used in a near-field communication (NFC) network, a telecommunications network, a local area network (LAN), a virtual LAN (VLAN), a wide area network (WAN), such as the Internet, or a combination of the these. Network 110 can include wired or wireless connections or a combination of wired and wireless connections. In an embodiment, computing environment 100 is a cloud computing environment. In various embodiments, communication between smart camera 10 and smart contact lenses 15 occurs wirelessly over network 110. In general, network 110 can be any combination of connections and protocols that will support communications between smart camera 10, smart contact lenses 15, and any other computing devices (not shown) within computing environment 100.

In various embodiments, smart camera 10 is a digital camera with computer processing capability to send and receive instructions, capture and edit digital images, analyze digital images (e.g., for gaze focal point or gaze direction), and communicate instructions and digital image data with assist app. 16 in smart contact lenses 15. Smart camera 10 may include internal and external hardware components, as depicted in more detail and described in FIG. 9. Smart camera 10 can be a standalone digital camera used by a photographer, a smart phone, a tablet, a digital camera on a tripod, or another digital image capture device with wireless communication capability and processing capability to execute photograph assist program 11. As known to one skilled in the art, smart cameras are commonly used in applications such as automated inspection for quality assurance, surveillance, robot guidance, etc. Smart camera 10 can be an intelligent camera with digital image capture circuitry that is capable of extracting digital image data, analyzing application specific information from the captured images, editing captured digital image data, and communicating data to and from smart contact lenses 15.

In various embodiments, smart camera 10 is a digital image capture device that can share data, such as digital image data and instructions with smart contact lenses 15 worn by a photograph subject. Additionally, smart camera 10 provides analysis of subject gaze direction, focal point determination, digital image editing, communication of instructions to and from a photographer using smart camera 10 and smart contact lenses 15 worn by a photographer's subject. Smart camera 10 includes one or more sensors (not depicted), such as, compass chips, image stabilization devices, audio devices, and/or range finder devices. In various embodiments, smart camera 10 provides an ability to manipulate or alter of the captured digital images based, on one or more instructions received from assist application (app.) 16 in smart contact lenses 15 or input by the photographer on UI 12. In some embodiments, smart camera 10 determines an angular orientation of smart camera 10, a configured focal length of smart camera 10 or a photographer selected focal length, a focal point, a focal point distance, and a field of view (FOV) of smart camera 10. As depicted in FIG. 1, smart camera 10 includes photograph assist program 11, UI 12, and storage 13.

Photograph assist program 11 in smart camera 10 can capture digital images of one or more users of smart contact lenses 15. In various embodiments, photograph assist program 11 sends captured digital image data to smart contact lenses 15 worn by the subjects in the digital image. In some embodiments, photograph assist program 11 receives requests from assist app. 16 in smart contact lenses 15 for one or more changes to the captured digital image. The subject inputs instructions on UI 17 for changes to the received digital image that are sent by assist app. 16 in smart contact lenses 15 to photograph assist program 11. The instructions can include a request to take another photograph with a different pose of the subject or a request to edit a captured digital image of the subject, such as, by changing a color of the subject's shirt.

In other embodiments, photograph assist program 11 receives instructions from the photographer or a user of smart camera 10 for a change by the subject for a new photograph. The instructions from the photographer may be received by UI 12 verbally or manually, by movement of a cursor, pointer, or a change in the subject's gaze direction. In some cases with a large group of subjects, the photographer using photograph assist program 11 and smart contact lenses 15 can send one or more requests to specific subjects in the group to move, change a gaze direction, remove an article of clothing or remove an adjacent background element. In some embodiments, photograph assist program 11 receives a set of desired poses or a set of desired gaze directions for a subject in a photo shoot from the photographer that are sent over network 110 to smart contact lenses 15 worn by the subject.

Smart camera 10 includes UI 12. UI 12 provides the functionality commonly provided by user interfaces in smart cameras, advanced digital cameras, mobile phones or smart mobile devices such as display screens with touch screens, voice recognition, natural language process, manipulation of a subject gaze direction to indicate a desired gaze direction of the subject, marker manipulation for identifying a gaze focal point, and a pop-up or pull down menu display for photographer selection. UI 12 enables a user of smart camera 10 to interact with assist app. 16 in smart contact lenses 15, and any other computing devices not shown in FIG. 1. In various embodiments, UI 12 includes at least a display screen, which can have touch sensitivity, audio recording and natural language processing capability, one or more dials, and menu screens in UI 12. UI 12 may receive and display digital image data to a photographer or smart camera 10 user and displays instructions to and from smart contact lenses 15 and photograph assist program 11.

Smart camera 10 may include storage 13. Storage 13 may receive, store, and send data to and from photograph assist program 11, smart contact lenses 15, and other computing devices not depicted in FIG. 1. For example, captured digital images, photographer provided instructions from UI 12, and data received from smart contact lenses 15 may reside in storage 13. Smart camera 10 may include internal and external hardware components, as depicted and described in further detail with respect to FIG. 9.

In various embodiments, smart contact lenses 15 are a pair of soft contact lenses inserted and worn in a photograph subject's eye similar to conventional contact lenses (e.g., for correcting vision) that include a number of biocompatible electronic devices or elements, such as processors chips and antennas. Smart contact lenses 15 may include sensors, one or more computer processors, and antennas but, are not limited to these devices. One example of a smart contact lens of a pair of smart contact lenses 15 is discussed in detail with respect to FIG. 2. In various embodiments, smart contact lenses 15 include UI 17 using an augmented reality display capability to display smart camera 10 captured digital images to the subject wearing smart contact lenses 15. Smart contact lenses 15, as depicted, include assist app. 16 and UI 17. Smart contact lenses 15 may include internal and external hardware components, as depicted and described in further detail with respect to FIG. 9.

In various embodiments, assist app. 16 is a computer application capable of sending and receiving data, such as, digital image data, instructions or requests, to and from photograph assist program 11 in smart camera 10. For example, assist app. 16 can receive input from a model or photograph subject on UI 17 in smart contact lenses 15 and data, such as digital images or instructions, from photograph assist program 11 in smart camera 10.

UI 17 provides an interface between the subject and assist app. 16 in smart contact lenses 15. UI 17 utilizes various aspects of user interface technology, such as gaze detection and augmented reality displays, for use in smart contact lens technology. In various embodiments UI 17 provides an overlay or an augmented reality (AR) display of the digital images captured and sent by smart camera 10 to assist app. 16 for display to the photograph subject or photograph model. In some embodiments, UI 17 includes a display of a desired gaze direction or a desired subject focal point from photograph assist program 11 input by the photographer. In some embodiments, sensors in smart contact lenses 15 scan the wearer's retina to determine a gaze direction of the wearer (e.g., a model) that is displayed in UI 17. In an embodiment, UI 17 includes one or more pull-down menus for a user selection of various options or requests to be sent to the photographer via photograph assist program 11 in smart camera 10. The selection of one or more options in UI 17 or in a pull-down menu displayed in UI 17 can occur, at least in part, by tracking a gaze direction of a subject on the overlay of a captured digital image in UI 17. For example, using gaze detection, a subject wearing smart contact lenses 15 can select an item in the pull-down menu presented in an augmented reality display in UI 17. In some embodiments, UI 17 receives inputs from one or more blinks recorded by one of the sensors in smart contact lenses 15.

Figure 2:
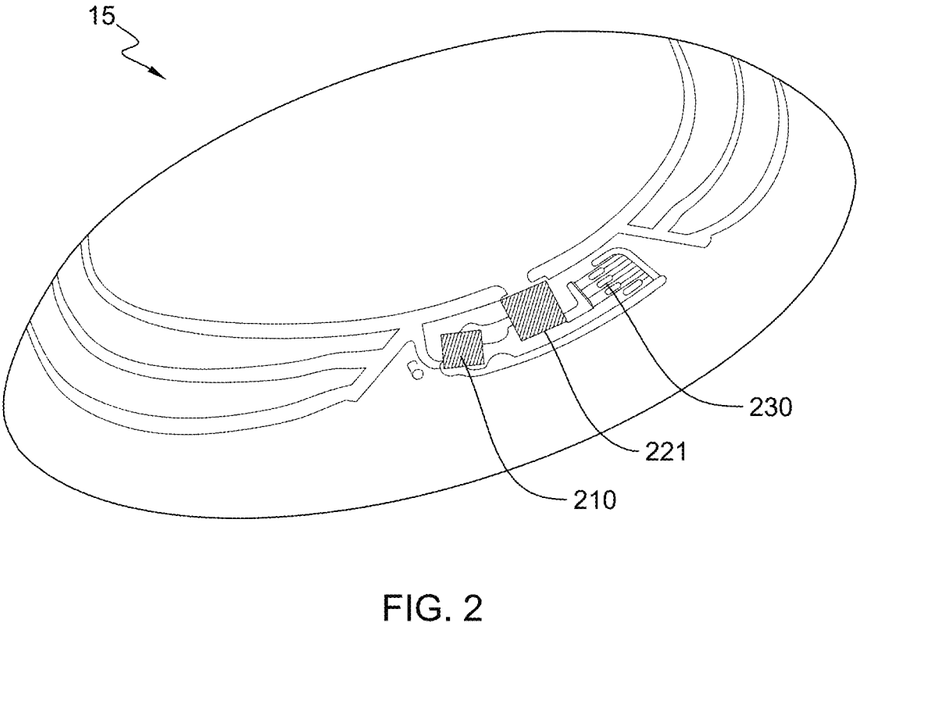
FIG. 2 is an illustration of smart contact lenses, according to an embodiment of the present invention.

FIG. 2 is an illustration of smart contact lenses 15, according to an embodiment of the present invention. As depicted, FIG. 2 includes a single smart contact lens of a pair of smart contact lenses 15. Smart contact lenses 15 includes at least sensors 210, chip 221, and antenna 231. Sensors 210 can be one or more of motion sensors, a compass chip, solar cells, retinal scanning devices, piezoelectric sensors, and any other suitable smart contact lenses sensors. For example, sensors 210 may determine when a subject wearing smart contact lenses 15 blinks rapidly twice (e.g., indicating an input to UI 17). In another example, sensors 210 can determine a gaze direction of the subject wearing smart contact lenses 15 using a compass chip and known gaze detection techniques.

While depicted as one chip in FIG. 2, chip 221 may be one or more very thin, biocompatible chips. Chip 221 may include one or more computer processors. Chip 221, utilizing assist app. 16 and UI 17, may receive data, process requests of a wearer of smart contact lenses 15, send data, and process received instructions, such as a photographer requested gaze direction photograph assist program 11. In some embodiments, the instructions for a photographer requested gaze direction is embedded in digital image data (e.g., the digital image data depicts a photographer desired gaze direction). In various embodiments, chip 221 provides a virtual display or an augmented reality overlay within the customer eye using UI 17 (e.g., an augmented reality display projecting content or digital images directly to the wearer's retina).

Antenna 230 can be one or more antennas for RF or other wireless communication with smart camera 10 and other electronic devices (not depicted in FIG. 1). Antenna 230 provides an ability for wireless communication over a range of frequencies. Antenna 230 can be one or more antenna's capable of being embedded or formed in smart contact lenses 15. In some examples, as depicted in FIG. 2, antenna 230 is formed with micro or nanowires embedded in smart contact lenses 15.

Figure 3A:
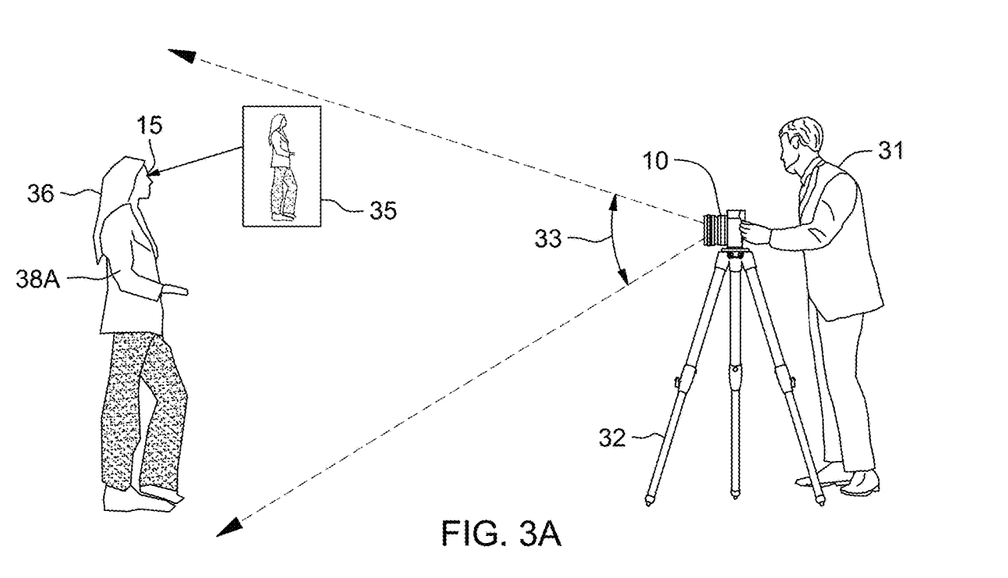
FIG. 3A is an illustration of a photographer capturing a digital image of a model who is wearing smart contact lenses, according to an embodiment of the present invention.

FIG. 3A is an illustration of photographer 31 capturing a digital image of model 36 who a user wearing smart contact lenses 15 for a photo shoot, according to an embodiment of the present invention. While depicted in FIGS. 3A, 3B, 3C, and 4 as model 36, model 36 can be any human subject of a digital image, photograph, or a desired digital image who is a user of assist app. 16 wearing smart contact lens 15. As depicted, FIG. 3A includes smart camera 10 with photograph assist program 11 and UI 12, photographer 31, tripod 32, field of view (FOV) 33 of smart camera 10, shirt 38, model 36 viewing overlay 35 of the captured digital image of model 36. While depicted in FIG. 3A, tripod 32 may not be present in other embodiments. In various embodiments, overlay 35 is an AR display viewed by model 36 in UI 17 of smart contact lenses 15 that are worn by model 36. Photograph assist program 11 in smart camera 10 sends the digital image data to smart contact lenses 15 based, on an input, such as a verbal command from the photographer, received by UI 12 in smart camera 10. The digital image data received by smart contact lenses 15 generates overlay 35 displayed to model 36.

Figure 3B:
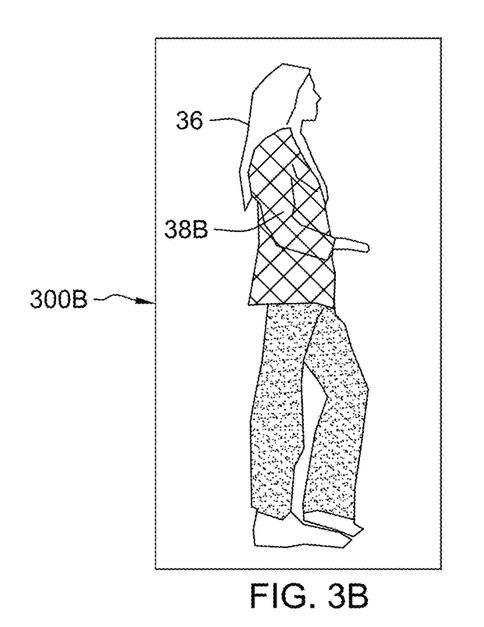
FIG. 3B is an illustration of a view of a digital image of the model after the smart camera receives a request from an application in the model's smart contact lenses to change a shirt color, according to an embodiment of the present invention.

FIG. 3B is an illustration of view 300B of model 36 after assist app. 16 sends a request from model 36 to photograph assist program 11 to change a shirt color, according to an embodiment of the present invention. View 300B is an example of the digital image of model 36 after photograph assist program 11 has digitally edited the digital image data previously captured by smart camera 10 (e.g., depicted in overlay 35 of FIG. 3A) in response to a request to change shirt 38A color received from assist app. 16 in smart contact lenses 15. Model 36 in FIG. 3A can use UI 17 (not depicted) in smart contact lenses 15 to send a request to photograph assist program 11 in smart camera 10 to change a color of shirt 38A. For example, shirt 38A is red. Using gaze detection, model 36 selects "change a color to blue" in a pull-down menu in UI 17. Model 36 may indicate by gaze direction on shirt 38A in overlay 35 that shirt 38A is to be changed to a blue color. Model 36 may indicate to assist app. 16, for example, by three quick blinks captured by the sensors in smart contact lenses 15, an instruction to send the request for the new color for shirt 38A to photograph assist program 11 in smart camera 10. In response to receiving the request from smart contact lenses 15, photograph assist program 11 creates view 300B by changing shirt 38A color to shirt 38B with a blue color. Photograph assist program 11 uses known digital image editing algorithms to edit the shirt color from red to blue. In some cases, after editing the color of the shirt to blue in shirt 38B, photograph assist program 11 sends the digital image data for view 300B back to smart contact lenses 15 for model approval of the change.

Figure 3C:
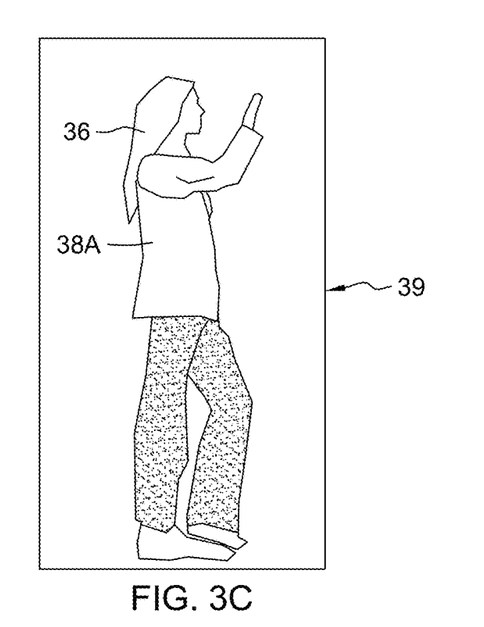
FIG. 3C is an illustration of a view of a digital image of the model after the smart camera receives a request from the application in the model's smart contact lenses capture a digital image of a new pose, according to an embodiment of the present invention.

FIG. 3C is an illustration of view 39 of model 36, according to an embodiment of the present invention. View 39 is an example of the digital image of model 36 in a user interface of smart camera 10 after photograph assist program 11 receives a request from smart contact lenses 15 to capture a new pose. Using assist app. 16 in smart contact lenses 15, model 36 inputs instructions for photograph assist program 11 to capture a new pose. For example, using the pull-down menu, model 36 selects an instruction to photograph assist program 11 to capture the new pose (e.g., depicted in view 39) and sends the instruction to photograph assist program 11. Model 36 may blink twice to indicate to assist app. 16 that the new pose is set and for assist app. 16 to send the request to photograph assist program 11 to capture the new pose. The sensors in smart contact lenses 15 can determine the rapid blinks and assist app. 16 can send the request. Assist app. 16 sends the indication to photograph assist program 11 that the new pose is ready. Upon receiving the indication that the new pose of model 36 is ready, smart camera 10 with photograph assist program 11, captures a digital image of model 36 with new pose depicted in view 39. In another embodiment, a pre-set delay time, such as three seconds, is used by photograph assist program 11 to take the photograph of the new pose after receiving the request from assist app. 16 to capture a digital image of view 39.

Figure 4:
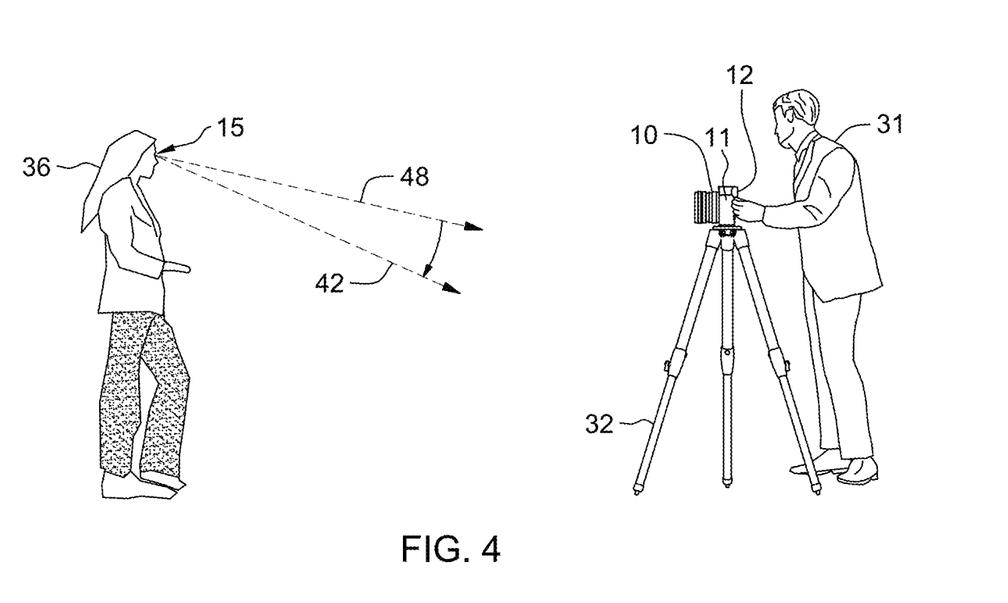
FIG. 4 is an illustration of the model receiving instructions from the photograph assist program for the model to change a gaze direction, according to an embodiment of the present invention.

FIG. 4 is an illustration of model 36 after receiving a request to change a gaze direction from photograph assist program 11, according to an embodiment of the present invention. As depicted, FIG. 4 includes smart camera 10 with photograph assist program 11 and UI 12, photographer 31, tripod 32, model 36 wearing smart contact lenses 15, gaze direction 48 of model 36, a desired gaze direction 42 requested by photographer 31 using photograph assist program 11. FIG. 4 provides an illustration of model 36 with gaze direction 48 as determined by photograph assist program 11 using a captured digital image of model 36 and a new requested gaze direction 42 from the photographer using photograph assist program 11.

In various embodiments, using the captured digital image data of model 36 and known gaze detection techniques in digital image analysis, photograph assist program 11 determines gaze direction 48 of model 36. In an embodiment, photograph assist program 11 queries assist app. 16 in smart contact lenses 15 for the gaze direction of model 36. In one embodiment, photograph assist program 11 receives, from UI 12, instructions for model 36 to look down about twenty degrees lower. For example, using voice recognition in UI 17 of smart camera 10, the photographer provides spoken instructions to photograph assist program 11. Photograph assist program 11 sends the instruction, which may be displayed as text in the overlay or augmented reality display in smart contact lenses 15 to model 36. An ability to send displayed photographer instructions to model 36 can be advantageous in loud photo shoots or when model 36 has difficulties hearing verbal instructions from the photographer due to distance from the photographer or model head gear. In another example, photographer 31 using UI 12 (not depicted) in smart camera 10 touches a displayed gaze direction of model 36 in UI 12 and moves the gaze direction downward about twenty degrees using the touch screen in UI 12 (e.g., moves gaze direction 48 to new gaze direction 42). Upon receiving new gaze direction 42 in UI 12, photograph assist program 11 sends instructions to assist app. 16 to display the desired new gaze direction 42 to model 36. New gaze direction 42 may be indicated as a line or as a focal point in UI 17 of smart contact lenses 15 to model 36.

In some embodiments, photograph assist program 11 analyzes the gaze direction of model 36 and determined when the gaze direction of model 36 is the same as desired new gaze direction 42. For example, when photograph assist program 11 determines that model 36's gaze direction is the same as desired gaze direction 42, photograph assist program 11 takes the photograph of model 36. In another example, when model 36's gaze direction is the same as new gaze direction 42, photograph assist program 11 places a red dot in UI 12 indicating to the photographer that the gaze direction of model 36 is the same as new gaze direction 42.

Figure 5:
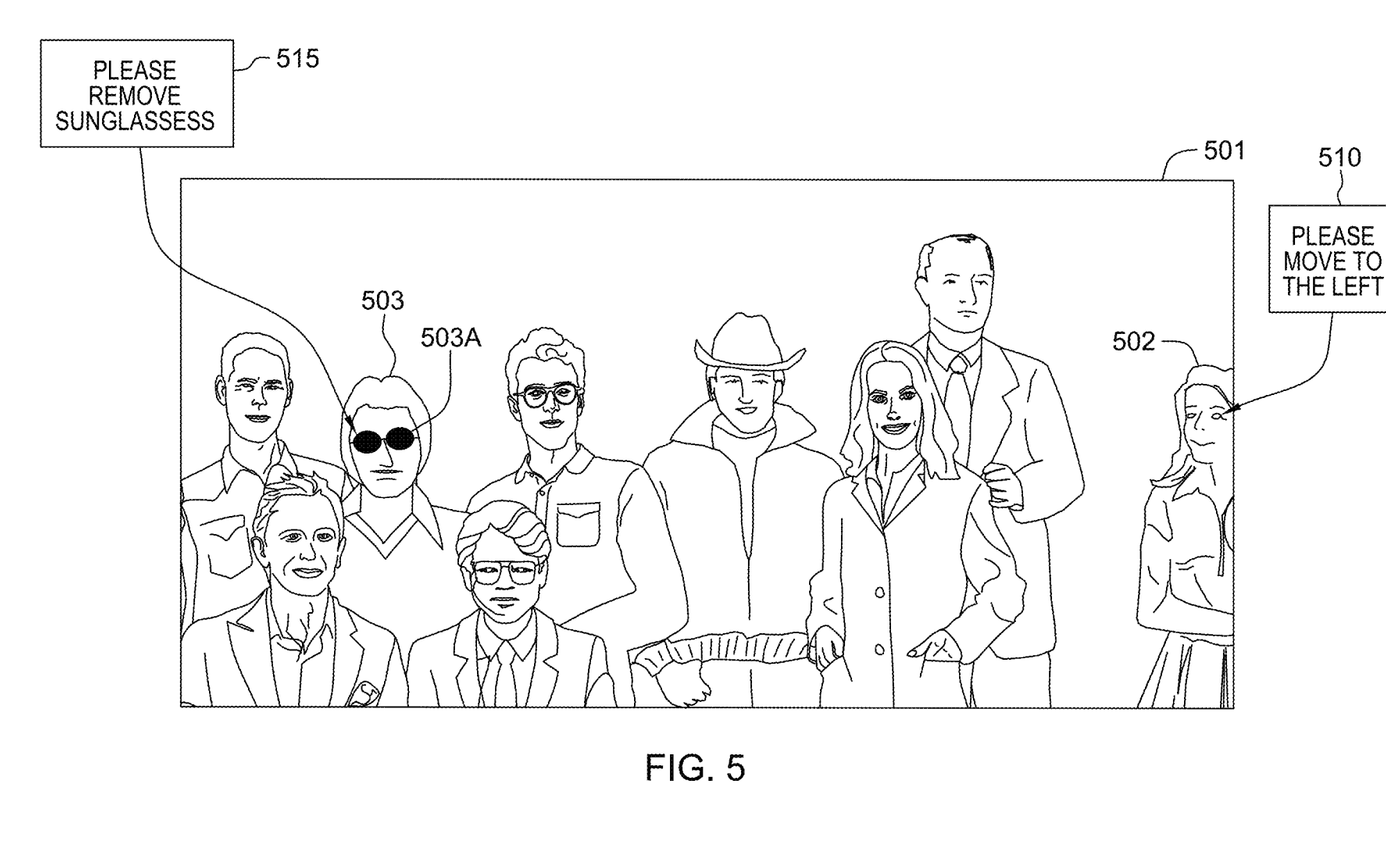
FIG. 5 is an illustration of a view of a group of subjects captured in a view of the smart camera with an instruction for two subjects in the group, according to an embodiment of the present invention.

FIG. 5 is an illustration of a group of subjects captured in view 501 of smart camera 10 with text instructions 510 and 515 for two subjects in the group, according to an embodiment of the present invention. In view 501, subject 502 is not completely included in view 501. Using natural language processing and voice recognition capabilities of the user interface (e.g., UI 12) in smart camera 10 (not depicted in FIG. 1), the photographer, verbally inputs to smart camera 10, a request for subject 502 to move to the left. Photograph assist program 11 sends the instruction for subject 502 to move to the left to assist app. 16 for display as text instruction 510 to subject 502 (e.g., in the overlay or augmented reality display of smart contact lenses 15 worn by subject 502).

In another example depicted in FIG. 5, photograph assist program 11 in smart camera 10, may receive a verbal input requesting subject 503 to remove sunglasses 503A from the photographer using UI 12. In this example, photograph assist program 11 sends text instruction 515 for subject 503 to remove their sunglasses to smart contact lenses 15 worn by subject 503. Smart contact lenses 15 display text instruction 515 to subject 503, for example, using an overlay or augmented reality display in UI 17 of smart contact lenses 15.

Figure 6:
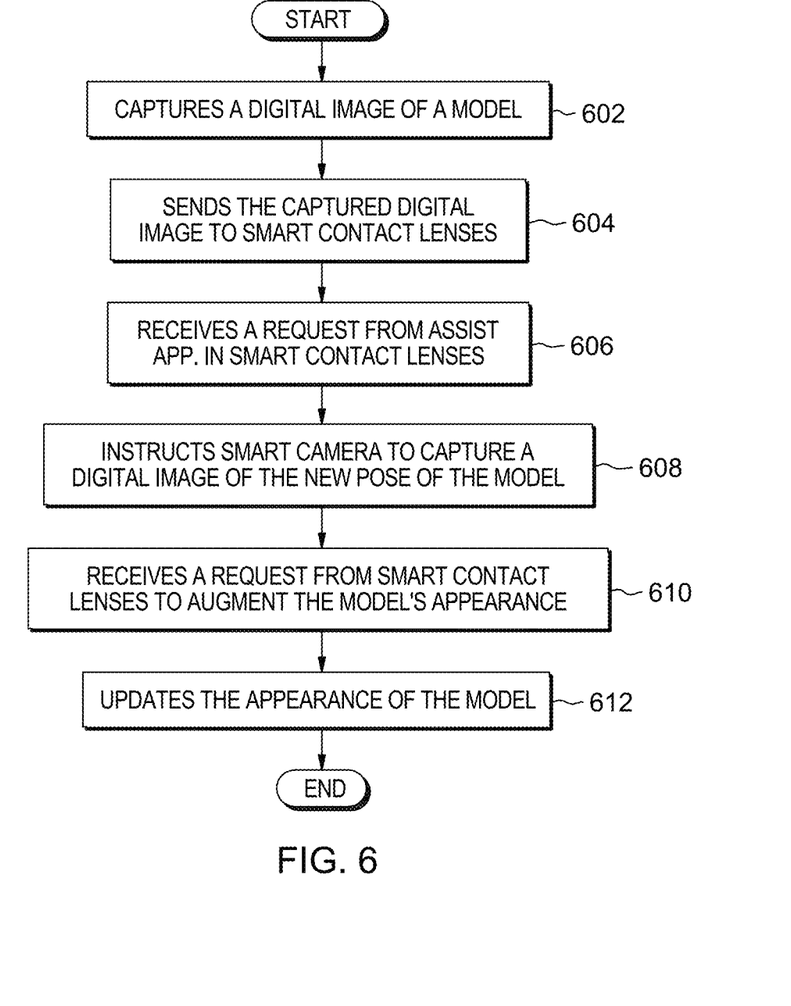
FIG. 6 is a flowchart depicting operational steps of the photograph assist program when a model, using an assist application in smart contact lenses, requests changes to the captured digital image, according to an embodiment of the present invention.

FIG. 6 is a flowchart depicting operational steps of photograph assist program 11 when a model, using an assist app. in smart contact lenses 15, requests changes to the captured digital image, according to an embodiment of the present invention. The operational steps of photograph assist program 11, for example, can reference the steps associated with FIGS. 3A, 3B, and 3C using computer environment 100 depicted in FIG. 1. However, the operational steps of photograph assist program 11 discussed in FIG. 6 are not limited to the steps associated with FIGS. 3A, 3B, and 3C but, may also apply also to other examples of photograph assist program 11.

In step 602, photograph assist program 11 captures a digital image of a model, such as model 36 in FIG. 3A. For example, upon receiving an input, such as, a depression of a shutter activation button on smart camera 10 by a photographer, smart camera 10 takes a digital photograph of model 36 who is wearing smart contact lenses 15. In various embodiments, one or more subjects who are wearing smart contact lenses 15 are captured in the digital image by photograph assist program 11 in smart camera 10.

In step 604, photograph assist program 11 sends the captured digital image to smart contact lenses 15 worn by model 36 in FIG. 3A. Assist app. 16 in smart contact lenses 15 worn by model 36 may receive the captured digital image data from photographer assist program 11 and displays the captured digital image to model 36 using a user interface (e.g., UI 17) in smart contact lenses 15. The captured digital image may be displayed in an augmented reality display in smart contact lenses 15 (e.g., overlay 35 depicted in FIG. 3A).

In step 606, photograph assist program 11 receives a request from assist app. 16 in smart contact lenses 15 to capture a new pose of model 36. Photograph assist program 11 receives an indication of the model's (e.g., model 36) desire to capture a different pose from assist app. 16. For example, using four rapid blinks, model 36 inputs to assist app. 16, an instruction for a request to capture of a new pose. The sensors (e.g., sensors 210 in FIG. 2) identify model's blinks as input or instructions to assist app. 16 requesting photograph assist program 11 to capture a digital image of a new pose. Assist app. 16 can send the request to capture the new pose to photograph assist program 11 in smart camera 10 over network 110.

In step 608, photograph assist program 11 instructs smart camera 10 to capture the new pose of the model. In one embodiment, in a pre-determined time, such as three seconds, after receiving the request from assist app. 16, photograph assist program 11 in smart camera 10 automatically takes the photograph of the new pose of the model (e.g., model 36) upon receiving the instructions or request from assist app. 16. In response to receiving the instructions or request from assist app. 16, photograph assist program 11 in smart camera 10 captures the photograph of the new pose.

In some embodiments, when photograph assist program 11 receives the instructions indicating that the model is ready with the new pose from assist app. 16, a green light flashes in the display (e.g., UI 12) of smart camera 10 to the photographer, who then takes the photograph capturing the digital image of the model with the new pose. In one embodiment, after a pre-determined time, such as five seconds, after receiving the instructions for capturing a new photograph from assist app. 16, photograph assist program 11 in smart camera 10 automatically captures the new pose of the model.

In step 610, photograph assist program 11 receives a request from smart contact lenses 15 to augment the subject's appearance. Assist app. 16 can send to photograph assist program 11 a request to change or alter one or more aspects of the model's appearance (e.g., apparel color, hair color, accessories, etc.) using known digital image editing algorithms. For example, assist 16 can receive, from the model using a pull-down menu in UI 17 of smart contact lenses 15, an input requesting a hair color change. For example, the model inputs a selection to change his or her hair color to red. Input can be received from the model's selection in a pull-down menu displayed in UI 17 indicated using gaze detection and blink detection. For example, the subject's gaze direction in the pull-down menu may be determined using one or more of sensors, such as sensors 210 depicted in FIG. 2. Sensors 210 can determine that when the model is gazing at his or her hair in the AR display (e.g., overlay 35 depicted in FIG. 1) and then, the model blinks twice quickly indicating a selection of the model's hair. With the two blinks, assist app. 16 receives an indication that a change of the model's hair color is desired. Sensors 210 may then determine a gaze direction of the model on a pull-down menu item indicating a color, for example "red", and sensors 210 then, receive an indication of another two blinks by the subject indicating a selection to change the subject's hair color to red. Assist app. 16 sends instructions for the request to photograph assist program 11.

In another example, photograph assist program 11 receives a request from assist app. 16 in smart contact lenses 15 worn by the model (e.g., model 36 in FIG. 3A) to change a color of shirt 38. In this example, photograph assist program 11 sends the captured digital image to model 36 which is displayed to model 36 in overlay 35 of FIG. 3A. Using the sensors in smart contact lenses 15, assist app. 16 receives model 36 input instructions (e.g., using gaze detection and blinks) to change shirt 38 color as previously described in detail with respect to FIG. 3B.

In step 612, photograph assist program 11 updates the appearance of the model. Responsive to receiving the request to augment or change the subject's appearance from assist app. 16, photograph assist program 11, using known digital image manipulation techniques, changes the model's hair to red. In other embodiments, the instructions for requested changes or alterations to the subject's appearance received by photograph assist program 11 include changes to apparel color, a change of a hair location (e.g., adding a beard), accessory changes, such as, removing glasses or jewelry, and adding accessories, or a hair color change. However, the requested changes to the model's appearance are not limited to these changes. In some cases, after updating or editing the digital image, photograph assist program 11 sends the edited digital image back to smart contact lenses 15 of the model. In some embodiments, the model sends one of an approval of the edited digital image or a request for one or more changes to the edited digital image back to photograph assist program 11. After performing the requested pose changes and/or requested alterations to the model's appearance, photograph assist program 11 may be complete. In this case, the photo shoot and photograph assist program 11 can end.

Figure 7:
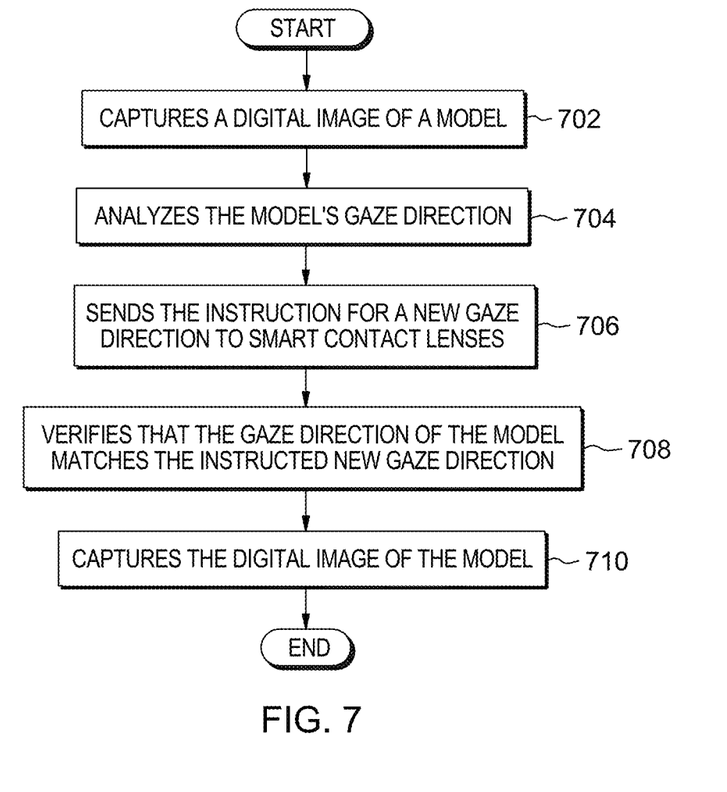
FIG. 7 is a flowchart depicting operational steps of the photograph assist program sending instructions to the model's smart contact lenses for a new gaze direction, according to an embodiment of the present invention.

FIG. 7 is a flowchart depicting operational steps of photograph assist program 11 sending instructions to assist app. 16 in smart contact lenses 15 worn by model 36 indicating a new gaze direction, according to an embodiment of the present invention. In some cases, a photographer using smart camera 10 desires model 36 to look in another direction in order to change model's pose or look. The operational steps of photograph assist program 11 are one example of a photographer using photograph assist program 11 to send a desired gaze direction to model 36 wearing smart contact lenses 15 with assist app. 16. FIG. 4 depicts one example of a desired gaze direction depicted as new gaze direction 42 of model 36. The operational steps of FIG. 6 are discussed with reference to FIG. 4 but, are not limited to this example.

In step 702, photograph assist program 11 in smart camera 19 receives a digital image of model 36. For example, after the photographer depresses the shutter button, photograph assist program 11 in smart camera 10 captures a digital image of model 36.

In step 704, photograph assist program 11 analyzes the model's gaze direction. For example, using known digital image analysis methods and inputs from a compass chip and/or other sensor in smart camera 10, photograph assist program 11 determines a gaze direction of model 36 (e.g., gaze direction 48 of model 36 depicted in FIG. 4). In one embodiment, photograph assist program 11 queries assist app. 16 in smart contact lenses 15 for the gaze direction of model 36 at the time of the digital image capture. In some embodiments, photograph assist program 11 determines a gaze focal point of model 36. Using the captured digital image data and known digital image analysis techniques, photograph assist program 11 can determine the gaze focal point of model 36 which can be illustrated as a red dot in the digital image.

In step 706, photograph assist program 11 receives an instruction from the photographer for a new gaze direction for the model from UI 12 of smart camera 10, (e.g., new gaze direction 42 depicted in FIG. 4). In some embodiments, the photographer views one of a gaze direction of model 36 or a focal point of the model 36's gaze. Smart camera 10 can provide a menu on multiple user interface screens (e.g., UI 12) that can be navigated by the photographer using a touch screen. Additionally, in some embodiments, UI 12 includes dials on smart camera 10 to navigate various options and actions in a display screen of UI 12 that can be selected by the photographer with a dial. An option in the displayed UI 12 menu that can be selected is "change gaze direction." The photographer in this case, may select "change gaze direction" and gaze direction 48 is depicted in the view finder (e.g., UI 12). The photographer may move gaze direction 48 downward, for example, by a dial movement, by a verbal instruction, such as, lower gaze direction ten degrees, or by touching the displayed gaze direction 48 in UI 12 and sliding the photographer's finger downward to desired gaze direction 42 on UI 12 when UI 12 includes touch screen capability.

In another embodiment, UI 12 of smart camera 10 includes a marker or dot indicating the focal point of the model's gaze as determined by photograph assist program 11. In this case, the photographer using UI 12 may touch and slide the marker (e.g., a red dot, a circle, a star, a small square, etc.) to a new location, such as about twenty degrees lower than the model's current captured gaze focal point to indicate new desired gaze direction 42.

In some embodiments, UI 12 receives a verbal instruction from the photographer. In this case, using known natural language processing and an audio device in UI 12, photograph assist program 11 processes the verbal instruction which could a spoken instruction for the model to look down about twenty degrees or in another example, to look to the right.

In another embodiment, the photographer selects a previously taken photograph from storage 13 in smart camera 10 (depicted in FIG. 1) for photograph assist program 11 to send to model 36 wearing smart contact lenses 15 as an instruction for a desired gaze direction.

In step 708, photograph assist program 11 sends the instruction to smart contact lenses 15. In various embodiments, the instruction to smart contact lenses 15 is an instruction to model 36 for a new gaze direction. Assist app. 16 may receive the instruction from the photographer provided by photograph assist program 11 to change their gaze direction. The instruction can be provided as one of text, a line indicating new gaze direction displayed in an AR display, such as overlay 35 (depicted in FIG. 3A), a previously taken digital image as an example of the desired gaze direction, or a new gaze focal point indicated by a marker, such as a star displayed in the AR display (e.g., overlay 35) in smart contact lenses 15 worn by the model. In response, the model makes a change to the pose by changing a gaze direction to the desired gaze direction.

In step 710, photograph assist program 11 verifies that the gaze direction of the model matches the instructed desired gaze direction (e.g., matches new gaze direction 42). Using known gaze direction determination methods, smart camera 10 verifies that current gaze direction of the model matches the instructed new gaze direction 42 sent by photograph assist program 11 to assist app. 16 in smart contact lenses 15. In various embodiments, photograph assist program 11 verifies that the gaze direction of the model matches the photographer desired gaze direction provided by photograph assist program 11. For example, photograph assist program 11 determines when the gaze direction of model 36 has changed and is the same as the desired gaze direction (e.g., when the current gaze direction of model 36 is the same as or directly over new gaze direction 42 depicted in FIG. 4). In this example, a light or a icon in UI 12 of smart camera 10 is lit or flashes in UI 12 to indicate to the photographer that model 36 now has new gaze direction 42. In one embodiment, photograph assist program 11 automatically captures the digital image of the model when the model's gaze direction matches the desired gaze direction provided by photograph assist program 11 to the model wearing smart contact lenses 15.

In some embodiments, photograph assist program 11 determines when the focal point of the model 36's gaze matches the desired focal point input by the photographer. A photographer, using the methods previously discussed and UI 12, can input a desired focal point for the model's gaze. For example, photograph assist program 11 receives a photographer input desired focal point of model 36's gaze by a tap on a tree in UI 12 of smart camera 10 to be a new focal point, and photograph assist program 11 sends an instruction to smart contact lenses 15 to display a red dot on the tree. When the instructed new focal point of the model 36's gaze and the focal point of the model's pose match, photograph assist program 11 can send instructions for UI 12 to flash or turn green, indicating to the photographer that focal point of the model's gaze matches the requested focal point for the gaze of the model (e.g., the tree). In this case, the photographer can take to the photograph capturing model 36 looking at the photographer's desired focal point.

In step 710, photograph assist program 11 captures the digital image of the model. In various embodiments, when photograph assist program 11 determines that either of model 36's gaze direction matches the requested gaze direction (e.g., new gaze direction 42) or when photograph assist program 11 determines that the gaze focal point of model 36 matches the photographer instructed gaze focal point then, photograph assist program 11 captures the digital image of model 36.

In one embodiment, photograph assist program 11 receives one or more photographer selected previous captured digital images of model 36 from storage 13 in smart camera 10. The photographer selected digital images from storage 13 can be used as an instruction for a desired pose. In some embodiments, when photograph assist program 11 determines that a pose of the model matches the pose in the selected previously captured digital image then, photograph assist program 11 captures the digital image of the model in the pose matching the pose of the selected previously captured digital image. In this case, if the program or the photographer has captured the desired digital images or photographs, the program may end.

Figure 8:
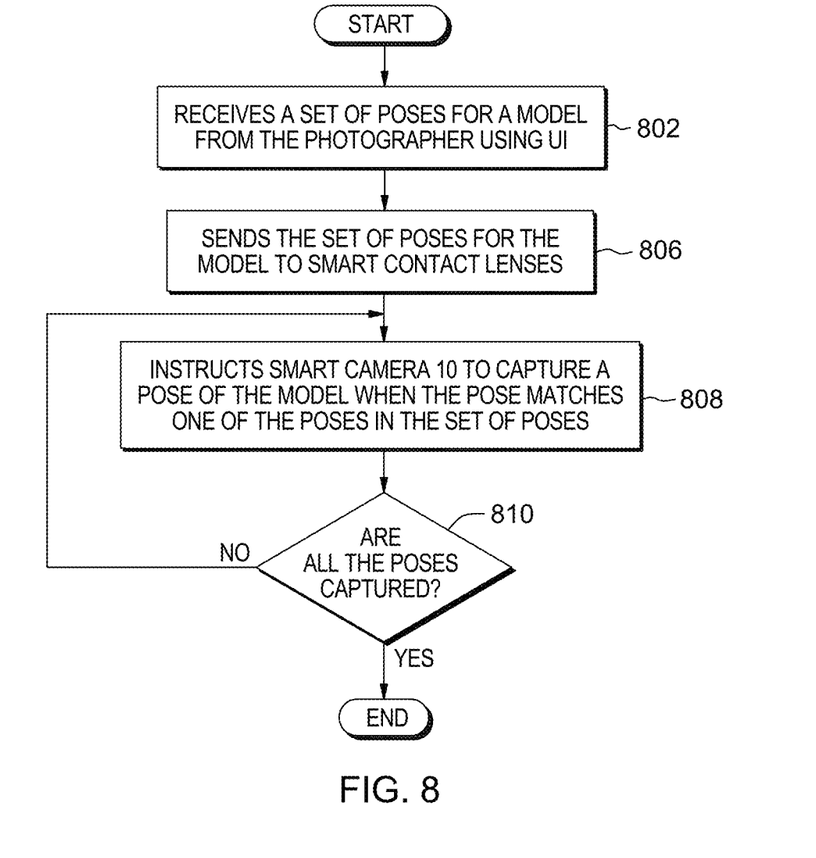
FIG. 8 is a flowchart depicting operational steps of the photograph assist program after receiving a set of poses for the model from the photographer, according to an embodiment of the present invention.

FIG. 8 is a flowchart depicting operational steps of photograph assist program 11 after receiving a set of poses for the model from the photographer, according to an embodiment of the present invention. In this case, to increase the speed of a photo shoot, a photographer may generate a series of desired poses for the model or models that can be sent to smart contact lenses 15.

In step 802, photograph assist program 11 receives a set of poses for a model from photograph assist program 11 that are input by the photographer using a user interface (e.g., UI 12 in FIG. 1). UI 12 may receive, from the photographer, the set of poses as one of a series of gaze directions, a series of gaze focal points, a series of previously taken digital images, or a series of verbal instructions, such as, look over your left shoulder, look straight ahead, and look up at the horizon as inputs or instructions for a series or set of desired poses. The photographer input gaze directions, input focal points, or input verbal instructions may be input as instructions to photograph assist program 11 by one or more of the methods previously discussed (e.g., a photographer selection of a set of previously captured digital images provided to photograph assist program 11).

In step 806, photograph assist program 11 sends the set of poses for the model to smart contact lenses 15 worn by the model. Assist app. 16 receives the set of poses and displays on the user interface of smart contact lenses 15. In various embodiments, the set of poses are displayed sequentially to the model wearing smart contact lenses 15 as one of a gaze direction, a gaze focal point, a previous digital image, an instruction in a text messages or in a series of text messages in the AR display, such as overlay 35 of smart contact lenses 15 in FIG. 3A. Assist app. 16 can display the instructions for each pose in the set of poses to the model sequentially using the user interface of smart contact lenses 15. In one embodiment, all of the poses in the set of poses are displayed to the model by assist app. 19 in a single AR display or a overlay in smart contact lenses 15.

In step 808, photograph assist program 11 instructs smart camera 10 to capture a pose of the model when the pose matches one of the poses in the set of poses. For example, when photograph assist program 11 determines that a gaze direction or a gaze focal point of the model matches one of the gaze directions or gaze focal points in the set of poses sent to smart contact lenses 15, then photograph assist program 11 instructs smart camera 10 to capture a digital image of the model. In another embodiment, when the model's pose matches one of the set of poses, UI 12 shows a marker or a flash, indicating that a desired pose is taken so that the photographer can take the photograph of the desired pose in the set of poses. When a pose of the set of poses is captured in a digital image on smart camera 10, photograph assist program 11 removes the pose from the set of poses. In some embodiments, photograph assist program 11 sends the updated set of poses the removes a captured pose from the set of poses to smart contact lenses 15.

In decision step 810, photograph assist program 11 determines whether all poses of the set of poses are captured. Responsive to determining that not all of the poses in the set of poses have been captured (no branch of decision step 810), photograph assist program 11 returns to step 806. Responsive to determining that all of the poses in the set of poses have been captured (yes branch of decision step 810), photograph assist program 11 ends.

Figure 9:
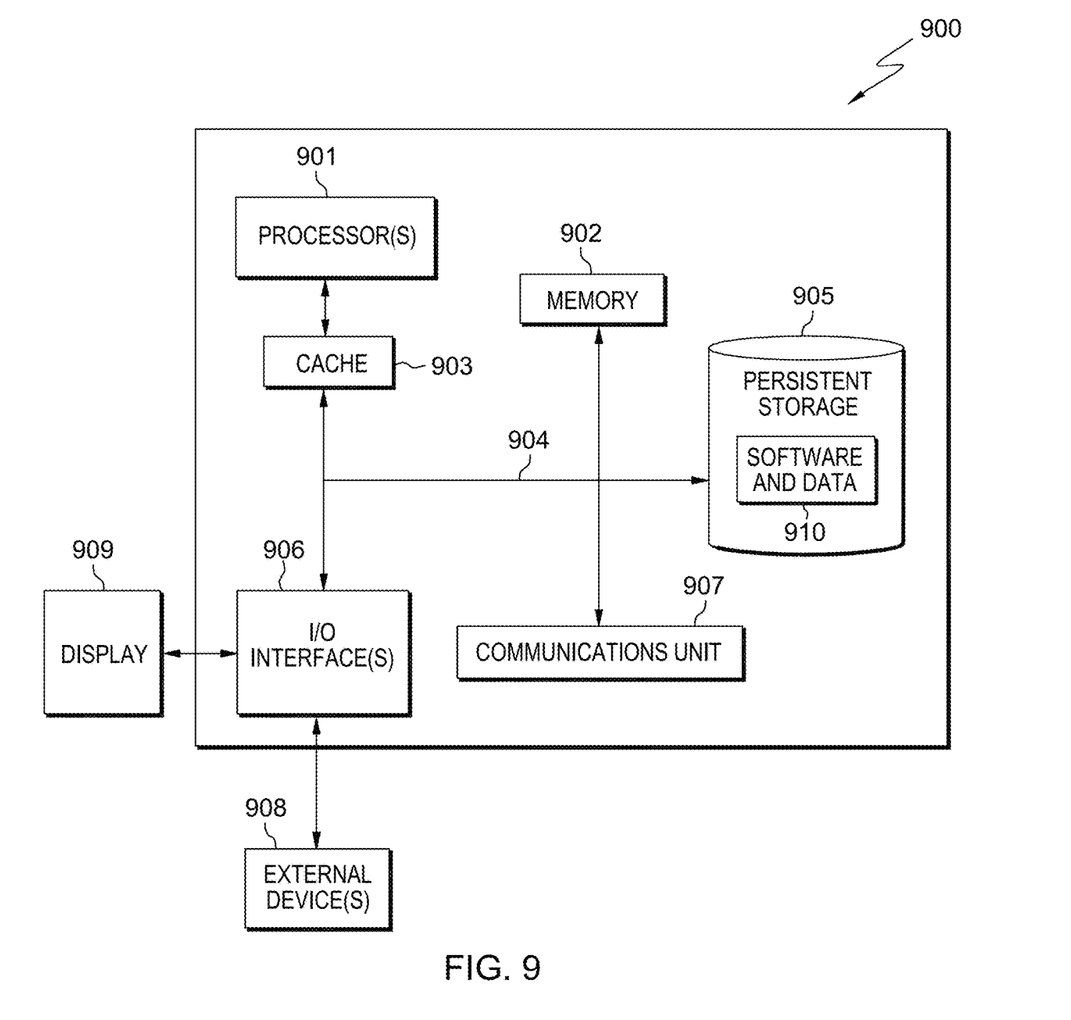
FIG. 9 is a block diagram depicting components of a computer system suitable for executing the photograph assist program, according to an embodiment of the present invention.

FIG. 9 is a block diagram depicting components of a computer system suitable for executing photograph assist program 11 in smart camera 10, in accordance with at least one embodiment of the invention. FIG. 9 depicts computer system 900, which is representative of smart camera 10 and smart contact lenses 15, in accordance with an illustrative embodiment of the present invention. It should be appreciated that FIG. 9 provides only an illustration of one implementation and does not imply any limitations with regard to the environments in which different embodiments may be implemented. The components computer system 900 of FIG. 9 are also suitable for executing assist application 16 on smart contact lenses 15. Many modifications to the depicted environment may be made. Computer system 900 includes processor(s) 901, cache 903, memory 902, persistent storage 905, communications unit 904, input/output (I/O) interface(s) 906, and communications unit 904. Communications unit 904 provides communications between cache 903, memory 902, persistent storage 905, communications unit 904, and input/output (I/O) interface(s) 906. Communications unit 904 can be implemented with any architecture designed for passing data and/or control information between processors (such as microprocessors, communications and network processors, etc.), system memory, peripheral devices, and any other hardware components within a system. For example, communications unit 904 can be implemented with one or more buses or a crossbar switch.

Memory 902 and persistent storage 905 are computer readable storage media. In this embodiment, memory 902 includes random access memory (RAM). In general, memory 902 can include any suitable volatile or non-volatile computer readable storage media. Cache 903 is a fast memory that enhances the performance of processor(s) 901 by holding recently accessed data, and data near recently accessed data, from memory 902.

Program instructions and data (e.g., software and data 910) used to practice embodiments of the present invention may be stored in persistent storage 905 and in memory 902 for execution by one or more of the respective processor(s) 901 via cache 903. In an embodiment, persistent storage 905 includes a magnetic hard disk drive. Alternatively, or in addition to a magnetic hard disk drive, persistent storage 905 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 905 may also be removable. For example, a removable hard drive may be used for persistent storage 905. Other examples include optical and magnetic disks, thumb drives, and smart cards that are inserted into a drive for transfer onto another computer readable storage medium that is also part of persistent storage 905. Software and data 910 can be stored in persistent storage 905 for access and/or execution by one or more of the respective processor(s) 901 via cache 903. With respect to smart camera 10, software and data 910 includes photograph assist program 11, UI 12 and can include storage 13. With respect to smart contact lenses 15, software and data 910 includes assist app. 16 and UI 17.

Communications unit 904, in these examples, provides for communications with other data processing systems or devices. In these examples, communications unit 904 includes one or more network interface cards. Communications unit 904 may provide communications through the use of either or both physical and wireless communications links. Program instructions and data (e.g., software and data 910) used to practice embodiments of the present invention may be downloaded to persistent storage 905 through communications unit 904.

I/O interface(s) 906 allows for input and output of data with other devices that may be connected to each computer system. For example, I/O interface(s) 906 may provide a connection to external device(s) 908, such as a keyboard, a keypad, a touch screen, and/or some other suitable input device. External device(s) 908 can also include portable computer readable storage media, such as, for example, thumb drives, portable optical or magnetic disks, and memory cards. Program instructions and data (e.g., software and data 910) used to practice embodiments of the present invention can be stored on such portable computer readable storage media and can be loaded onto persistent storage 905 via I/O interface(s) 906. I/O interface(s) 906 also connect to display 909.

Display 909 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute a resource entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
receiving, by one or more processors, digital image data from a smart camera;
sending, by one or more processors, the digital image data from the smart camera to smart contact lenses worn by a first user in the digital image data;
receiving, by one or more processors, an instruction requesting an alteration to at least one aspect of an appearance of the first user from an application in the smart contact lenses worn by the first user;
sending, by one or more processors, the instruction from the second user for the at least one change to the subject to the smart contact lenses worn by the first user;
executing, by one or more processors, the alteration to the at least one aspect of the appearance of the first user;
capturing, by one or more processors, digital image data of the first user after the alteration to the at least one aspect of the appearance of the first user;
receiving, by one or more processors, from a user interface in the smart camera, an instruction from a second user for at least one change to the first user; and
sending, by one or more processors, the instruction from the second user for the at least one change to the subject to the smart contact lenses worn by the first user.

2. The computer-implemented method of claim 1, wherein the instruction from the second user for the at least one change to the subject includes a change of a gaze direction of the first user.

3. The computer-implemented method of claim 1, wherein the instruction from the second user for the at least one change to the first user includes changing an accessory of the first user.

4. The computer-implemented method of claim 1, wherein the instruction from the second user for the at least one change to the subject includes changing a location of a subject in a group of more than one of the first users that are in a view in the smart camera.

5. The computer-implemented method of claim 1, wherein receiving from the application in the smart contact lenses worn by the first user, the instruction requesting to the alteration to the at least one aspect of the appearance of the first user includes changing a hair color of the first user.

6. The computer-implemented method of claim 1, further comprising:
receiving, by one or more processors, from an application in the smart contact lenses worn by the first user, a request to capture a digital image of a second pose of the first user, input by the first user on a user interface of the smart contact lenses; and
capturing, by one or more processors, the digital image of the second pose of the first user with the smart camera.

7. The computer-implemented method of claim 1, further comprises:
sending, by one or more processors, to the application in the smart contact lenses worn by the first user, the digital image data of the first user after executing the alteration to the at least one aspect of the appearance of the first user.

8. A computer program product for providing access to a resource shared by a plurality of processes in a computer system, the computer program product comprising:
one or more computer readable storage media; and
program instructions stored on the one or more computer readable storage media, the program instructions executable by a processor, the program instructions comprising instructions for:
receiving digital image data from a smart camera;
sending the digital image data from the smart camera to smart contact lenses worn by a first user in the digital image data from the smart camera;
receiving an instruction requesting an alteration to at least one aspect of an appearance of the first user from an application in the smart contact lenses worn by the first user;
executing the alteration to the at least one aspect of the appearance of the first user;
capturing digital image data of the first user after the alteration to the at least one aspect of the appearance of the first user;
receiving from a user interface in the smart camera, an instruction from a second user capturing the digital image data for at least one change to the first user; and
sending the instruction from the second user for the at least one change to the smart contact lenses worn by the first user.

9. The computer program product of claim 8, wherein the instruction from the second user for the at least one change to the first user includes a change of a gaze direction of the first user.

10. The computer program product of claim 8, wherein the instruction from the second user for the at least one change to the first user includes changing an accessory of the first user.

11. The computer program product of claim 8, wherein receiving from the application in the smart contact lenses worn by the first user, the instruction requesting to the alteration to the at least one aspect of the appearance of the first user includes changing a hair color of the subject.

12. The computer program product of claim 8, wherein receiving from the application in the smart contact lenses worn by the first user, the instruction requesting to the alteration to the at least one aspect of the appearance of the first user includes changing a hair color of the first user.

13. A computer system for providing exclusive access to a resource shared by a plurality of processes in a computer system, the computer system comprising:
one or more computer processors;
one or more computer readable storage media; and
program instructions, stored on the one or more computer readable storage media for execution by at least one of the one or more computer processors, the program instructions comprising instructions for:
receiving digital image data from a smart camera;
sending the digital image data from the smart camera to smart contact lenses worn by a first user in the digital image data from the smart camera;
receiving an instruction requesting an alteration to at least one aspect of an appearance of the first user from an application in the smart contact lenses worn by the first user;
executing the alteration to the at least one aspect of the appearance of the first user;
capturing digital image data of the first user after the alteration to the at least one aspect of the appearance of the first user;
receiving from a user interface in the smart camera, an instruction from a second user capturing the digital image data for at least one change to the first user; and
sending the instruction from the second user for the at least one change to the smart contact lenses worn by the first user.

14. A computer system of claim 13, wherein the instruction from the second user for the at least one change to the first user includes a change of a gaze direction of the first user.

15. A computer system of claim 13, wherein the instruction from the second user for the at least one change to the first user includes changing an accessory of the first user.

16. A computer system of claim 13, wherein receiving from the application in the smart contact lenses worn by the first user, the instruction requesting to the alteration to the at least one aspect of the appearance of the first user includes changing a hair color of the first user.

17. A computer system of claim 13, wherein receiving from the application in the smart contact lenses worn by the first user, the instruction requesting to the alteration to the at least one aspect of the appearance of the first user includes changing a hair color of the first user.

* * * * *